UNITED STATES PATENT OFFICE.

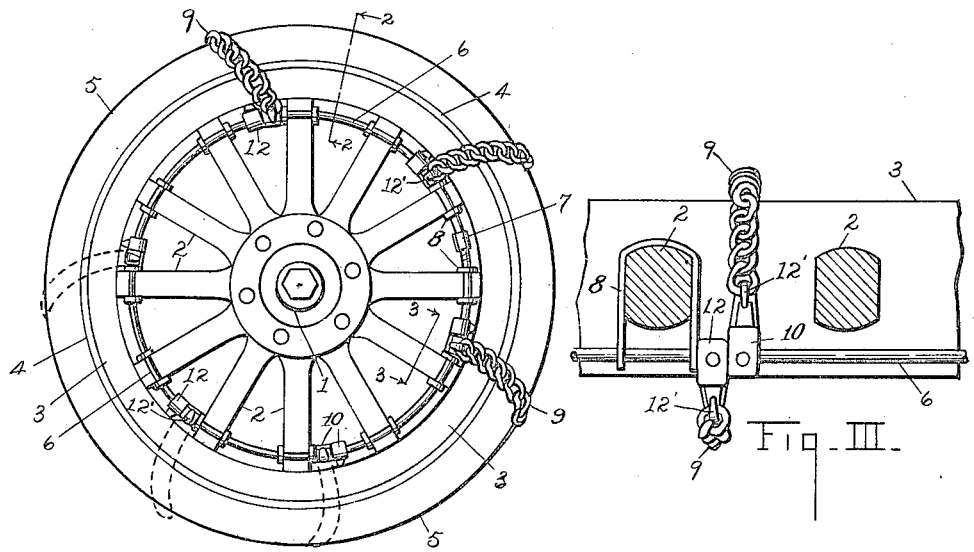
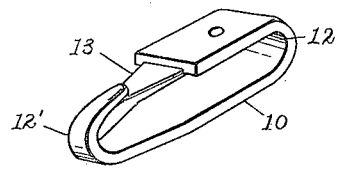
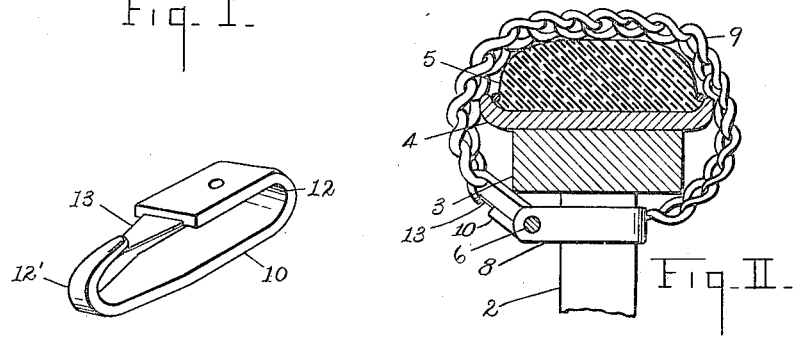
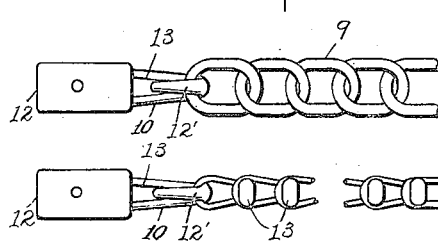
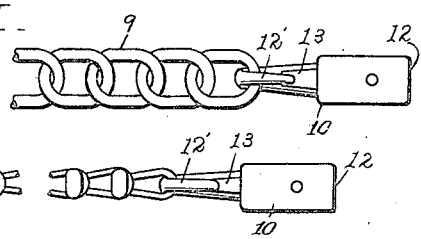

CHAUNCEY W. HODGES, OF KALAMAZOO, MICHIGAN.

WHEEL TRACTION AND ANTISLIP DEVICE.

1,372,692.  Specification of Letters Patent.  Patented Mar. 29, 1921.

Application filed March 21, 1918. Serial No. 223,826.

*To all whom it may concern:*

Be it known that I, CHAUNCEY W. HODGES, a citizen of the United States, residing at the city and county of Kalamazoo, State of Michigan, have invented certain new and useful Improvements in Wheel Traction and Antislip Devices, of which the following is a specification.

This invention relates to improvements in wheel traction and anti-slip devices.

My improvements are especially designed by me for use on driving wheels on motor trucks and other heavy power driven vehicles although advantageous for use in other relations.

The main objects of this invention are:

First, to provide an improved traction and anti-slip device for wheels which is well adapted to receive and withstand severe strains and stresses.

Second, to provide an improved traction or anti-slip device for wheels in which the number of tread members may be increased or diminished as desired.

Third, to provide an improved wheel traction or anti-slip device which permits the attachment or removal of the tread members one at a time and further one in which the tread members are quickly attached or removed.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side elevation of a wheel embodying the features of my invention.

Fig. II is a transverse section thereof on a line corresponding to line 2—2 of Fig. I.

Fig. III is a detail section on a line corresponding to line 3—3 of Fig. I.

Fig. IV is a front perspective view of the tread chain securing hooks.

Fig. V is a view of one of the tread chains detached, partially broken away, the illustration of the chain being more or less conventional.

Fig. VI is a detail view of a modified tread chain partially broken away.

Referring to the drawing, 1 represents the hub, 2 the spokes and 3 the felly of a wheel. The felly is provided with a rim 4 on which the cushion tire 5 is arranged. These parts are shown conventionally.

I arrange a ring-like or annular retaining member 6 at one side of the spokes and preferably close to the rim. This retaining member is in the form of a split ring provided with a turn buckle 7. The turn buckle may be disengaged to permit the engagement of the retaining member with the spoke clips 8, that is, with the turn buckle disengaged the ring may be threaded through holes provided therefor in the arms of the U-shaped spoke clips 8. These U-shaped spoke clips are of such shape as to embrace the spokes 2 and of such length as to allow the retaining member to be threaded through the holes in the arms thereof, as illustrated.

The tread chains 9 are secured to this ring by means of the loop-like hooks 10. These loop-like hooks are formed from bars of iron bent to shape as shown in Fig. IV. When engaged the bights 12 of the hooks engage the retaining member, the tread chains being engaged with the bills 12' of the hooks. Spring tongues 13 are provided to prevent accidental engagement of the hooks.

In the modification shown in Fig. VI I provide a special form of link, the same being substantially that shown in my Patent No. 1,229,613, June 12, 1917.

The hooks 11 are engaged with the retaining member so as to slide quite freely thereon except as limited by the spokes. The hooks are arranged in oppositely disposed pairs between the spokes and facing inwardly so that the stress on the tread members does not tend to disengage the chains from the hooks. The chains may be removed or replaced very quickly and without tools and may be applied or removed without "jacking up" the wheel, which is a very great advantage.

My improved anti-slip or tread device is well adapted for heavy trucks and motor vehicles.

The facility with which the tread members may be applied or removed encourages drivers of vehicles to use them only when required. The structure is very well adapted for use on vehicles engaged in military operations as the structure is not only strong and durable but permits of quick application and removal of the tread members.

Having thus described my invention, what I claim as new and desire to secure by Letters Patent, is:

1. In a structure of the class described, the combination with a wheel, of a resilient annular member disposed at one side of the spokes and adjacent to but in a spaced relation to the rim and mounted on the spokes by means of U-shaped clips embracing the spokes and having holes in their arms through which the retaining member is arranged, and tread chain attaching hooks adapted to receive the opposite ends of tread chains arranged over the tread of the wheel engaged with said retaining member between said clips and freely movable thereon between the clips, the clips constituting stops for the hooks and guards for the spokes.

2. In a structure of the class described, the combination with a wheel, of a resilient annular member disposed at one side of the spokes and adjacent to but in a spaced relation to the rim and mounted on the spokes, and tread chain attaching members adapted to receive the opposite ends of tread chains arranged over the tread of the wheel engaged with said retaining member between the spokes and freely movable thereon between the spokes.

In witness whereof I have hereunto set my hand and seal in the presence of two witnesses.

CHAUNCEY W. HODGES. [L. S.]

Witnesses:
 LUELLA G. GREENFIELD,
 MARGARET L. GLASGOW.